US010481567B2

(12) United States Patent
Saito

(10) Patent No.: US 10,481,567 B2
(45) Date of Patent: Nov. 19, 2019

(54) GEAR TOOTH PROFILE SIMULATION APPARATUS AND METHOD, AND MACHINING TOOL EDGE SURFACE SIMULATION APPARATUS AND METHOD

(71) Applicant: JTEKT CORPORATION, Osaka-shi (JP)

(72) Inventor: Akira Saito, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 331 days.

(21) Appl. No.: 15/428,738

(22) Filed: Feb. 9, 2017

(65) Prior Publication Data
US 2017/0235283 A1  Aug. 17, 2017

(30) Foreign Application Priority Data
Feb. 16, 2016  (JP) ................................ 2016-026846

(51) Int. Cl.
*G05B 13/04*  (2006.01)
*G05B 19/4097*  (2006.01)
(Continued)

(52) U.S. Cl.
CPC .............. *G05B 13/04* (2013.01); *B23F 21/00* (2013.01); *B23F 23/00* (2013.01); *F16H 1/12* (2013.01);
(Continued)

(58) Field of Classification Search
CPC ................ G05B 13/04; G05B 19/4097; G05B 2219/23456; G05B 2219/23005;
(Continued)

(56) References Cited

U.S. PATENT DOCUMENTS 5,485,761 A * 1/1996 Rouverol ................ F16H 55/08
29/893.3
6,535,788 B1 * 3/2003 Yoshida ........... G05B 19/40931
700/191
(Continued)

FOREIGN PATENT DOCUMENTS

JP        4048090        2/2008
JP      2014-237185    12/2014
JP      2014237185 A  * 12/2014

OTHER PUBLICATIONS

Chiang, CJ et al., Computerized gear cutting simulation using a psuedo-planar method, Proceedings IMechE, vol. 223 Part B: Journal of Engineering Manufacture, pp. 1541-1551 (Year: 2009).*
(Continued)

*Primary Examiner* — Kamini S Shah
*Assistant Examiner* — Russ Guill
(74) *Attorney, Agent, or Firm* — Oblon, McClelland, Maier & Neustadt, L.L.P.

(57) ABSTRACT

A simulation apparatus includes: a memory to store information on the shape of a workpiece, information on a cross section of a portion of the workpiece, and information on definition points indicating the shape of an edge surface of tool edges of a machining tool; a first calculator to perform a calculation to obtain passage points in a three-dimensional coordinate system; a second calculator to cause the cross section in the three-dimensional coordinate system to be disposed parallel to a plane defined by predetermined two of the axes of the three-dimensional coordinate system, thus converting the passage points in the three-dimensional coordinate system into passage points in a two-dimensional coordinate system; and a third calculator to decide, in accordance with the passage points in the two-dimensional (Continued)

coordinate system, the shape of a tooth profile to be formed on the workpiece in the two-dimensional coordinate system.

15 Claims, 18 Drawing Sheets

(51) Int. Cl.
*B23F 21/00* (2006.01)
*B23F 23/00* (2006.01)
*F16H 1/12* (2006.01)
*B23F 5/16* (2006.01)

(52) U.S. Cl.
CPC .......... *G05B 19/4097* (2013.01); *B23F 5/163* (2013.01); *G05B 2219/23005* (2013.01); *G05B 2219/23456* (2013.01)

(58) Field of Classification Search
CPC .. F16H 1/12; B23F 23/00; B23F 21/00; B23F 5/163
See application file for complete search history.

(56) References Cited

U.S. PATENT DOCUMENTS

| | | | |
|---|---|---|---|
| 9,969,019 B2* | 5/2018 | Wuerfel | B23F 9/02 |
| 2005/0159938 A1 | 7/2005 | Shigemi et al. | |
| 2015/0106063 A1* | 4/2015 | Hao | G06F 17/5086 |
| | | | 703/1 |

OTHER PUBLICATIONS

Li, JianGang, Numerical computing method of noncircular gear tooth profiles generated by shaper cutters, International Journal of Advanced Manufacturing Technology, vol. 33, pp. 1098-1105 (Year: 2007).*

Nicklas Bylund, "Understanding the basic principles of power skiving," Apr. 2017, GearSolutions, four pages (Year: 2017).*

Erkuo Guo et al., "Research on the cutting mechanism of cylindrical gear power skiving," Feb. 10, 2015, International Journal of Advanced Manufacturing Technology, pp. 541-550 (Year: 2015).*

* cited by examiner

1

GEAR TOOTH PROFILE SIMULATION APPARATUS AND METHOD, AND MACHINING TOOL EDGE SURFACE SIMULATION APPARATUS AND METHOD

INCORPORATION BY REFERENCE

The disclosure of Japanese Patent Application No. 2016-026846 filed on Feb. 16, 2016 including the specification, drawings and abstract is incorporated herein by reference in its entirety.

BACKGROUND OF THE INVENTION

1. Field of the Invention

The invention relates to gear tooth profile simulation apparatuses and methods, and machining tool edge surface simulation apparatuses and methods.

2. Description of the Related Art

Gear machining simulation apparatuses known in the related art are disclosed in, for example, Japanese Patent Application Publication No. 2014-237185 (JP 2014-237185 A) and Japanese Patent No. 4048090. To determine required motor performance, the simulation apparatus disclosed in JP 2014-237185 A calculates, for example, a cutting vector so as to compute a cutting force, and computes, in accordance with the cutting vector and the cutting force, a torque to be applied to a workpiece or a machining tool.

The simulation apparatus disclosed in Japanese Patent No. 4048090 performs a gear cutting simulation in accordance with a blank model of a workpiece, a cutter model of a machining tool, and the relative positions of the models, thus generating a gear model from the blank model of the workpiece.

The simulation apparatus disclosed in JP 2014-237185 A is used for gear machining that involves: using a machining tool including on its outer periphery a plurality of tool edges; causing the central axis of a workpiece and the central axis of the machining tool to incline relative to each other and to be skew to each other; synchronously rotating the workpiece and the machining tool; and rectilinearly moving, in this state, the machining tool along the central axis of the workpiece.

Japanese Patent No. 4048090, however, mentions neither the gear machining described in JP 2014-237185 A nor a simulation to determine the shape of an edge surface from the shape of a tooth profile.

SUMMARY OF THE INVENTION

An object of the invention is to provide a gear tooth profile simulation apparatus and method for performing a simulation to determine, for gear machining, the shape of a tooth profile from the shape of an edge surface, and a machining tool edge surface simulation apparatus and method for performing a simulation to determine the shape of an edge surface from the shape of a tooth profile.

An aspect of the invention provides a simulation apparatus for performing a simulation of a tooth profile of a gear to be formed by gear machining. The gear machining involves: causing a central axis of a workpiece and a central axis of a machining tool including on its outer periphery a plurality of tool edges to incline relative to each other; synchronizing rotation of the workpiece around the central axis of the workpiece and rotation of the machining tool around the central axis of the machining tool; and rectilinearly moving, in this state, the machining tool relative to the workpiece along the central axis of the workpiece, and forming the gear on the workpiece.

The simulation apparatus includes a memory, a first calculator, a second calculator, and a third calculator. The memory is configured to store information on a shape of the workpiece, information on a shape of a cross section of a portion of the workpiece that is necessary for the simulation and is to be machined into the gear, and information on a plurality of definition points indicating a shape of an edge surface of each tool edge of the machining tool. The first calculator is configured to perform, in accordance with the information stored in the memory, a calculation to obtain a plurality of passage points in a three-dimensional coordinate system where the definition points will pass through the cross section during the gear machining. The second calculator is configured to cause the cross section in the three-dimensional coordinate system to be disposed parallel to a plane defined by predetermined two of axes of the three-dimensional coordinate system, and converting the passage points in the three-dimensional coordinate system obtained by the first calculator into passage points in a two-dimensional coordinate system. The third calculator is configured to decide, in accordance with the passage points in the two-dimensional coordinate system obtained by the second calculator, a shape of the tooth profile to be formed on the workpiece in the two-dimensional coordinate system.

When the shape of the machining tool is known, the above configuration makes it possible to perform a simulation of a cross section of a portion of the workpiece that requires the simulation and is to be machined into the gear by the machining tool. This enables examination of differences between simulation values and theoretical values indicative of the shape of the tooth profile to be formed by the machining tool. In the process of the simulation, the simulation apparatus converts the three-dimensional coordinate system into the two-dimensional coordinate system, resulting in a reduction in processing load and an increase in processing speed.

Another aspect of the invention provides a simulation method for performing a simulation of a tooth profile of a gear to be formed by gear machining. The gear machining involves: causing a central axis of a workpiece and a central axis of a machining tool including on its outer periphery a plurality of tool edges to incline relative to each other; synchronizing rotation of the workpiece around the central axis of the workpiece and rotation of the machining tool around the central axis of the machining tool; and rectilinearly moving, in this state, the machining tool relative to the workpiece along the central axis of the workpiece, and forming the gear on the workpiece.

The simulation method includes: a) storing information on a shape of the workpiece, information on a shape of a cross section of a portion of the workpiece that is necessary for the simulation and is to be machined into the gear, and information on a plurality of definition points indicating a shape of an edge surface of each tool edge of the machining tool; b) performing, in accordance with the information stored in step a), a calculation to obtain a plurality of passage points in a three-dimensional coordinate system where the definition points will pass through the cross section during the gear machining; c) causing the cross section in the three-dimensional coordinate system to be disposed parallel to a plane defined by predetermined two of axes of the three-dimensional coordinate system, and converting the passage points in the three-dimensional coordinate system obtained in step b) into passage points in a two-dimensional coordinate system; and d) deciding, in accordance with the passage points in the two-dimensional coordinate system obtained in step c), a shape of the tooth profile to be formed on the workpiece in the two-dimensional coordinate system. Thus, the simulation method achieves effects similar to those of the above simulation apparatus.

Still another aspect of the invention provides a simulation apparatus for performing a simulation of an edge surface of each of a plurality of tool edges on an outer periphery of a machining tool for gear machining. The gear machining involves: causing a central axis of a workpiece and a central axis of the machining tool to incline relative to each other; synchronizing rotation of the workpiece around the central axis of the workpiece and rotation of the machining tool around the central axis of the machining tool; and rectilinearly moving, in this state, the machining tool relative to the workpiece along the central axis of the workpiece, and forming a gear on the workpiece.

The simulation apparatus includes a memory, a first calculator, a second calculator, and a third calculator. The memory is configured to store information on a shape of the workpiece, information on a shape of a cross section of the tool edge of the machining tool that is necessary for the simulation, and information on a plurality of definition points indicating a shape of a tooth profile of the gear. The first calculator is configured to perform, in accordance with the information stored in the memory, a calculation to obtain a plurality of passage points in a three-dimensional coordinate system where the definition points will pass through the cross section during the gear machining. The second calculator is configured to cause the cross section in the three-dimensional coordinate system to be disposed parallel to a plane defined by predetermined two of axes of the three-dimensional coordinate system, and converting the passage points in the three-dimensional coordinate system obtained by the first calculator into passage points in a two-dimensional coordinate system. The third calculator is configured to decide a shape of the edge surface in the two-dimensional coordinate system in accordance with the passage points in the two-dimensional coordinate system obtained by the second calculator.

When the shape of the gear is known, the above configuration makes it possible to perform a simulation of a cross section of the tool edge of the machining tool that requires the simulation. This enables examination of differences between simulation values and theoretical values indicative of the shape of the edge surface of the tool edge of the machining tool. In the process of the simulation, the simulation apparatus converts the three-dimensional coordinate system into the two-dimensional coordinate system, resulting in a reduction in processing load and an increase in processing speed.

Yet another aspect of the invention provides a simulation method for performing a simulation of an edge surface of each of a plurality of tool edges on an outer periphery of a machining tool for gear machining. The gear machining involves: causing a central axis of a workpiece and a central axis of the machining tool to incline relative to each other; synchronizing rotation of the workpiece around the central axis of the workpiece and rotation of the machining tool around the central axis of the machining tool; and rectilinearly moving, in this state, the machining tool relative to the workpiece along the central axis of the workpiece, and forming a gear on the workpiece.

The simulation method includes: a) storing information on a shape of the workpiece, information on a shape of a cross section of the tool edge of the machining tool that is necessary for the simulation, and information on a plurality of definition points indicating a shape of a tooth profile of the gear; b) performing, in accordance with the information stored in step a), a calculation to obtain a plurality of passage points in a three-dimensional coordinate system where the definition points will pass through the cross section during the gear machining; c) causing the cross section in the three-dimensional coordinate system to be disposed parallel to a plane defined by predetermined two of axes of the three-dimensional coordinate system, and converting the passage points in the three-dimensional coordinate system obtained in step b) into passage points in a two-dimensional coordinate system; and d) deciding a shape of the edge surface in the two-dimensional coordinate system in accordance with the passage points in the two-dimensional coordinate system obtained in step c). Thus, the simulation method achieves effects similar to those of the above simulation apparatus.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A gear tooth profile simulation apparatus according to an embodiment of the invention is used for gear machining. Basic motions of a machining tool 10 and a workpiece 20 during gear machining will be described with reference to FIGS. 1 and 2. The following description is based on the assumption that teeth 21 having an involute tooth profile are formed on the inner peripheral surface of the workpiece 20. The simulation apparatus according to the embodiment of the invention may also be used for gear machining that involves forming teeth on the outer peripheral surface of the workpiece 20. The simulation apparatus according to the embodiment of the invention may also be used for gear machining that involves forming teeth having a tooth profile other than an involute tooth profile, such as a trochoid tooth profile or a cycloid tooth profile.

Figure 1:
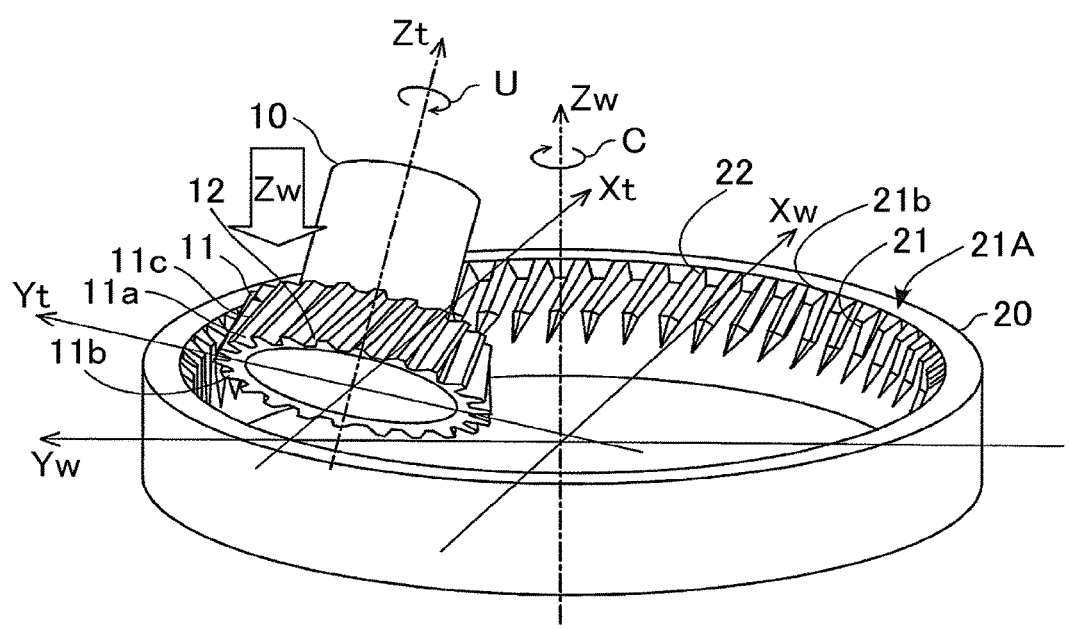
FIG. 1 is a perspective view of a machining tool and a workpiece, illustrating basic motions of the machining tool and the workpiece during gear machining.

As illustrated in FIG. 1, the workpiece 20 has an annular shape. The workpiece 20 is provided on its inner peripheral surface with the teeth 21 of a gear 21A. In the following description, a cross-sectional shape of each tooth 21 perpendicular to a tooth space 22 between the teeth 21 adjacent to each other will be referred to as a "tooth profile 21b". The workpiece 20 is supported so as to be rotatable around its central axis Zw. In other words, the workpiece 20 is rotatable around a C-axis. A workpiece coordinate system perpendicular to the central axis Zw is indicated by Xw-Yw.

Figure 2:
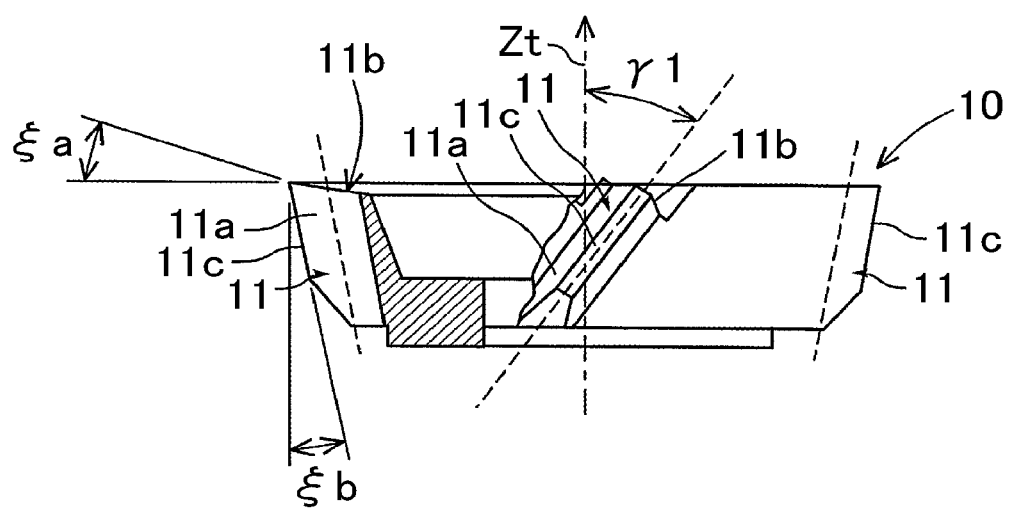
FIG. 2 is a schematic partial cross-sectional view of the machining tool illustrated in FIG. 1.

As illustrated in FIGS. 1 and 2, the machining tool 10 includes on its outer periphery a plurality of tool edges 11. Each tool edge 11 is an elongated protrusion. Each tool edge 11 includes: a lateral surface 11a extending in the direction of extension of the tool edge 11; an end face 11b at the end of the tool edge 11 in the direction of extension thereof; and a radially outer surface 11c. In the following description, a cross-sectional shape of each tool edge 11 perpendicular to an edge space 12 between the tool edges 11 adjacent to each other will be referred to as an "edge surface". The edge surface is equivalent to the end face 11b and may thus be referred to as an "edge surface 11b". The machining tool 10 is supported so as to be rotatable around its central axis Zt. In other words, the machining tool 10 is rotatable around a U-axis. A tool coordinate system perpendicular to the central axis Zt is indicated by Xt-Yt.

In this embodiment, each tool edge 11 has a helix angle γ1 relative to the central axis Zt of the machining tool 10. Alternatively, each tool edge 11 may be configured so that the helix angle γ1 is zero. The radially outer surface 11c of each tool edge 11 is inclined relative to the central axis Zt.

A cylindrical plane circumscribing the tool edges 11 has a conical shape. The radially outer surface 11c of each tool edge 11 has an inclination angle ξb equivalent to a clearance angle during cutting. The end face 11b of each tool edge 11 is inclined by an angle ξa with respect to a plane orthogonal to the central axis Zt. The inclination angle ξa of the end face 11b of each tool edge 11 is equivalent to a rake angle during cutting.

As illustrated in FIG. 1, the central axis Zt of the machining tool 10 is inclined relative to the central axis Zw of the workpiece 20 and skew to the central axis Zw. This means that the central axis Zt of the machining tool 10 and the central axis Zw of the workpiece 20 are not parallel to each other.

In this state, with the machining tool 10 and the workpiece 20 rotated synchronously, the machining tool 10 is rectilinearly moved relative to the workpiece 20 along the central axis Zw of the workpiece 20 as indicated by the large arrow (marked with Zw) in FIG. 1. Alternatively, the machining tool 10 may be moved substantially along the central axis Zw of the workpiece 20, or the workpiece 20 may be moved along the central axis Zw of the workpiece 20.

Because the central axis Zt of the machining tool 10 and the central axis Zw of the workpiece 20 are inclined relative to each other such that one of the central axes Zt and Zw extends in a slanting direction relative to the other one of the central axes Zt and Zw, a relative velocity occurs between the machining tool 10 and the workpiece 20 at a machining point. This causes the machining tool 10 to cut the workpiece 20. Thus, as illustrated in FIG. 1, the teeth 21 are formed on the inner peripheral surface of the workpiece 20. FIG. 1 illustrates the teeth 21 that are being formed on the workpiece 20. Continuing the cutting operation will form the teeth 21 across the entire axial length of the workpiece 20.

A gear machining apparatus that performs gear machining for which the simulation apparatus according to this embodiment is to be used may be a five-axis machining center, for example. In this case, the machining tool 10 and the workpiece 20 may be relatively rectilinearly moved in three axial directions perpendicular to each other, the machining tool 10 and the workpiece 20 may be respectively rotated around a U-axis and a C-axis, and the central axis Zt of the machining tool 10 and the central axis Zw of the workpiece 20 may be inclined relative to each other.

The simulation apparatus according to this embodiment determines the shape of each tooth 21 to be formed when the workpiece 20 is machined by the machining tool 10 having a known shape, or determines the shape of each tool edge 11 of the machining tool 10 to form the teeth 21 each having a known shape. The following description is based on the assumption that the simulation apparatus determines the shape of the tooth profile 21b of the teeth 21 of the internal gear 21A to be formed when the workpiece 20 is machined by the known machining tool 10.

Figure 3:
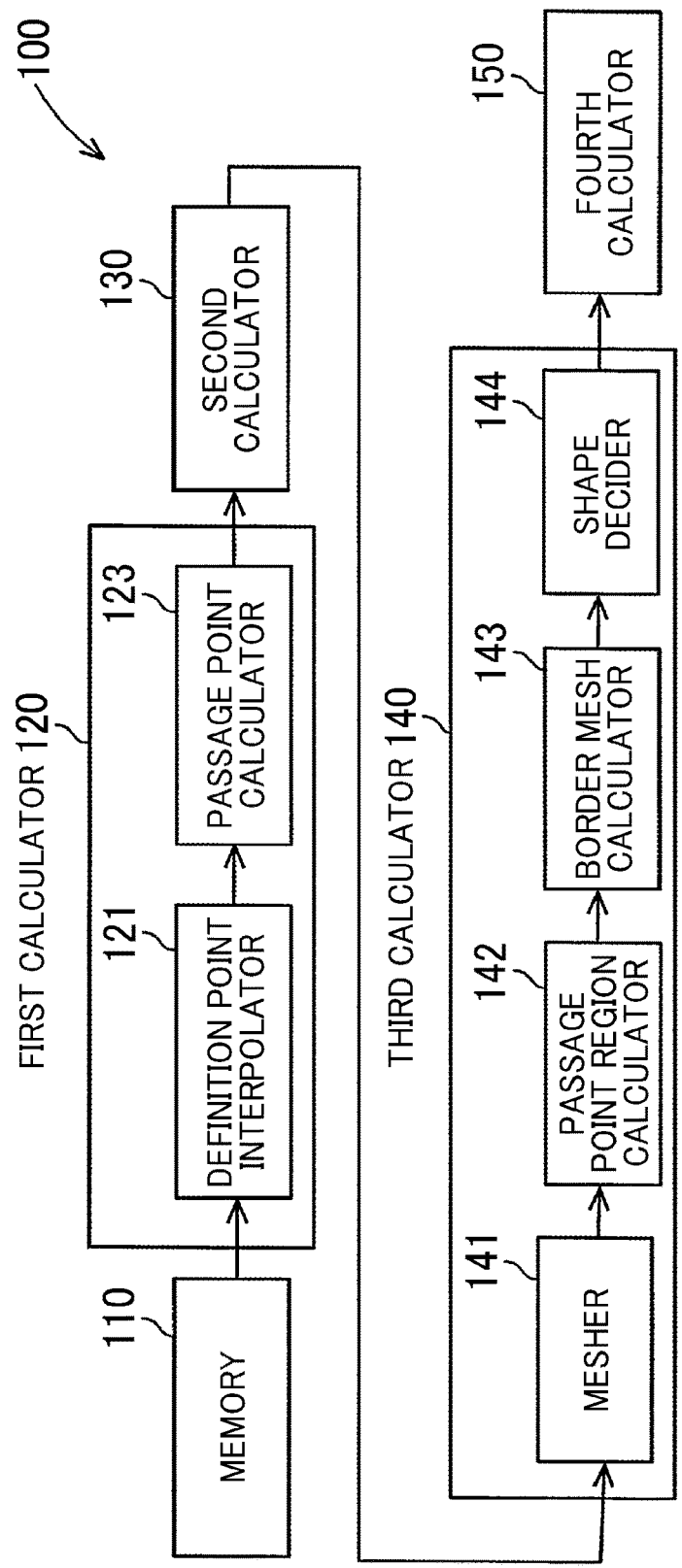
FIG. 3 is a functional block diagram of a simulation apparatus according to an embodiment of the invention.

As illustrated in FIG. 3, a simulation apparatus 100 according to this embodiment includes a memory 110, a first calculator 120, a second calculator 130, a third calculator 140, and a fourth calculator 150. The first calculator 120 includes a definition point interpolator 121 and a passage point calculator 123. The third calculator 140 includes a mesher 141, a passage point region calculator 142, a border mesh calculator 143, and a shape decider 144.

Figure 6:
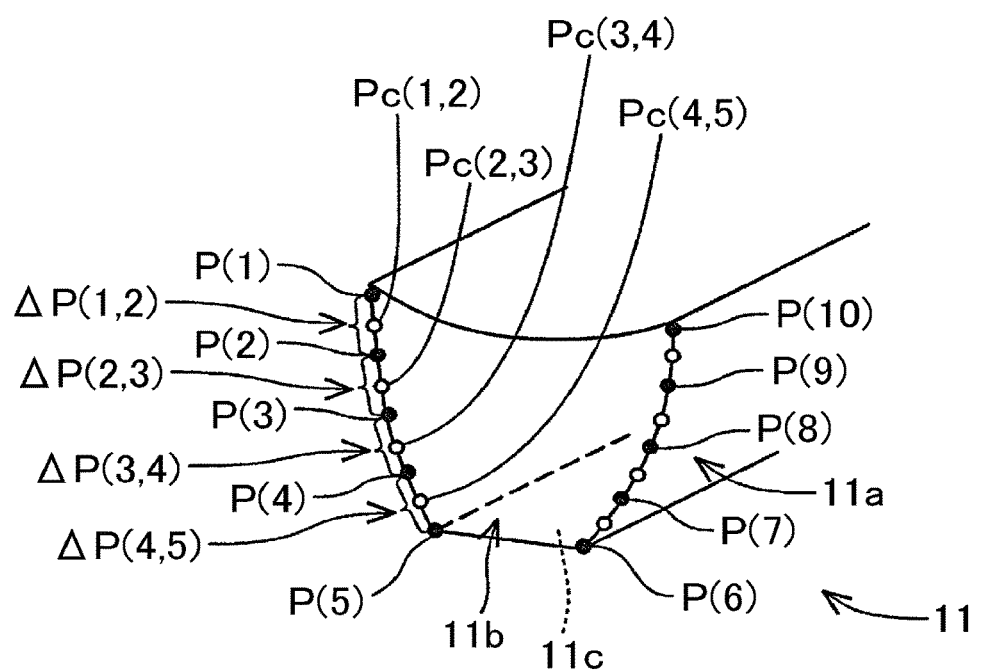
FIG. 6 is a perspective view of a tool edge, illustrating definition points of an edge surface determined by a definition point interpolator in FIG. 3.

The memory 110 stores: information on the shape of the workpiece 20; information on a cross section of a portion of the workpiece 20 that requires a simulation and is to be machined into the gear 21A, e.g., information on any given cross section S perpendicular to the tooth space 22 between the teeth 21 to be formed on the workpiece 20 (see FIG. 4B, for example); and information on a plurality of definition points indicating the shape of the edge surface 11b of each tool edge 11 of the machining tool 10, e.g., information on a plurality of definition points P (k) (where k=1 to n) defining a boundary between the edge surface 11b and the lateral surface 11a of each tool edge 11 of the machining tool 10 (see FIG. 6, for example). The functions of the memory 110 correspond to a "storing step" of a simulation method according to this embodiment. Note that n is a suitable value determined in accordance with an edge height and/or simulation accuracy, for example. For convenience, n is 10 in FIG. 6, but n is more suitably 30 or more.

The memory 110 further stores information on the gear 21A, information on the machining tool 10, information on machining conditions, and information on calculation conditions. The information on the gear 21A includes a normal module, the number of teeth, a helix angle, a calculation region, and a gear starting point position. The information on the machining tool 10 includes a normal module, the number of edges, a helix angle, and a tool starting point position. The information on machining conditions includes a tool rotation direction, a gear rotation direction, and a gear rotation axis inclination angle. The information on calculation conditions includes a mesh width.

Figure 4A:
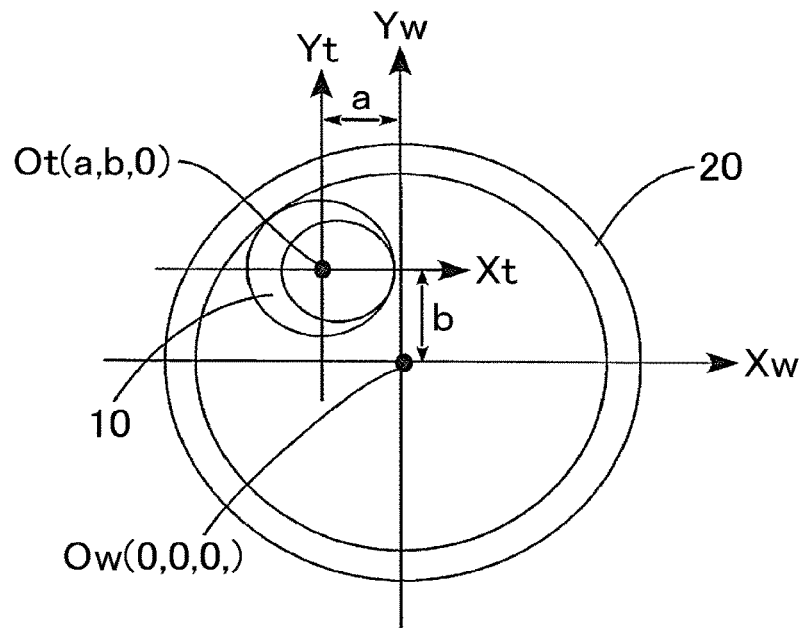
FIG. 4A is a diagram illustrating a gear starting point position in a gear coordinate system (Xw, Yw) and a tool starting point position in a tool coordinate system (Xt, Yt) stored in a memory in FIG. 3.
Figure 4B:
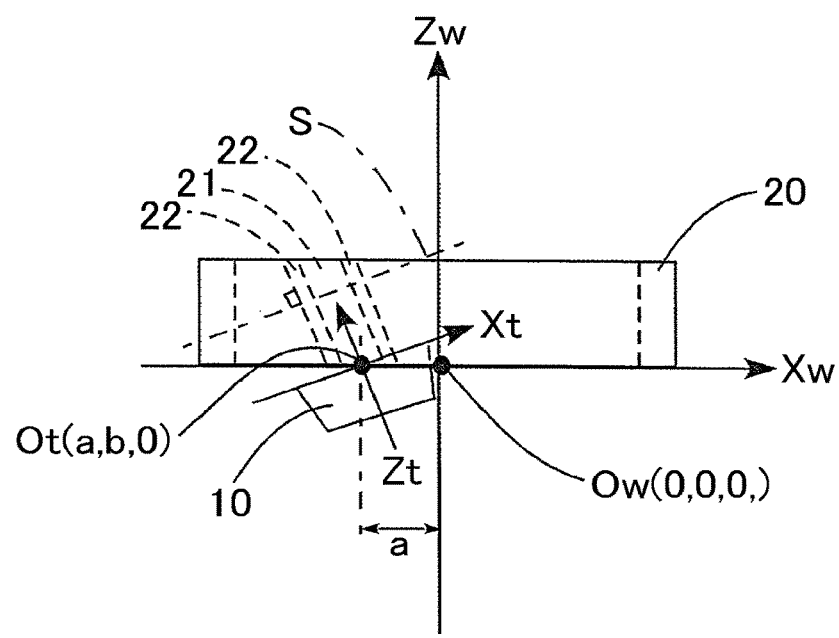
FIG. 4B is a diagram illustrating a gear starting point position in a gear coordinate system (Xw, Zw) and a tool starting point position in a tool coordinate system (Xt, Zt) stored in the memory in FIG. 3.

The gear starting point position, the tool starting point position and the calculation region included in the information just described are as follows: as illustrated in FIGS. 4A and 4B, from the positional relationship between the workpiece 20 and the machining tool 10, the gear starting point position is represented as Ow (0, 0, 0) in a gear coordinate system (Xw, Yw, Zw), and the tool starting point position is represented as Ot (a, b, 0) in a tool coordinate system (Xt, Yt, Zt).

Figure 5A:
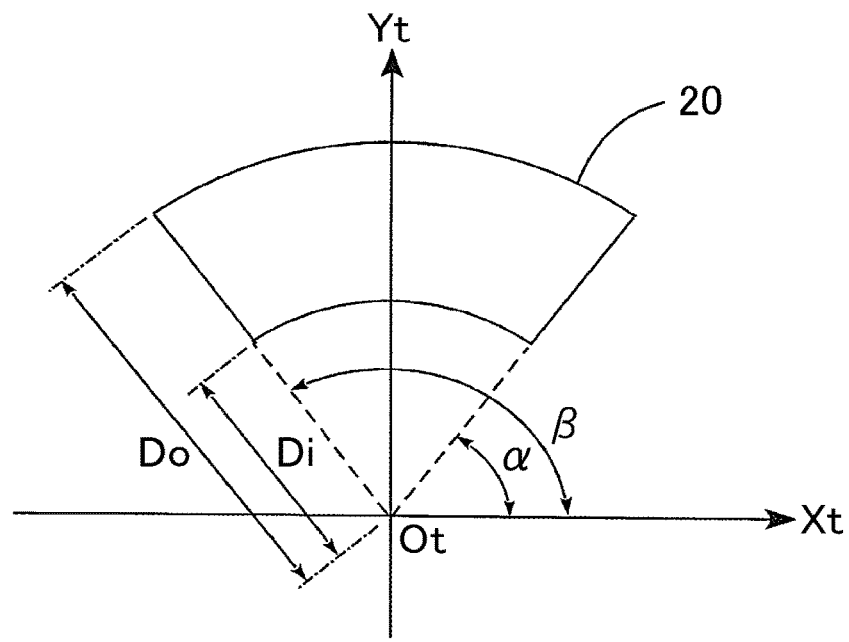
FIG. 5A is a diagram illustrating a calculation region in the gear coordinate system (Xw, Yw) stored in the memory in FIG. 3.
Figure 5B:
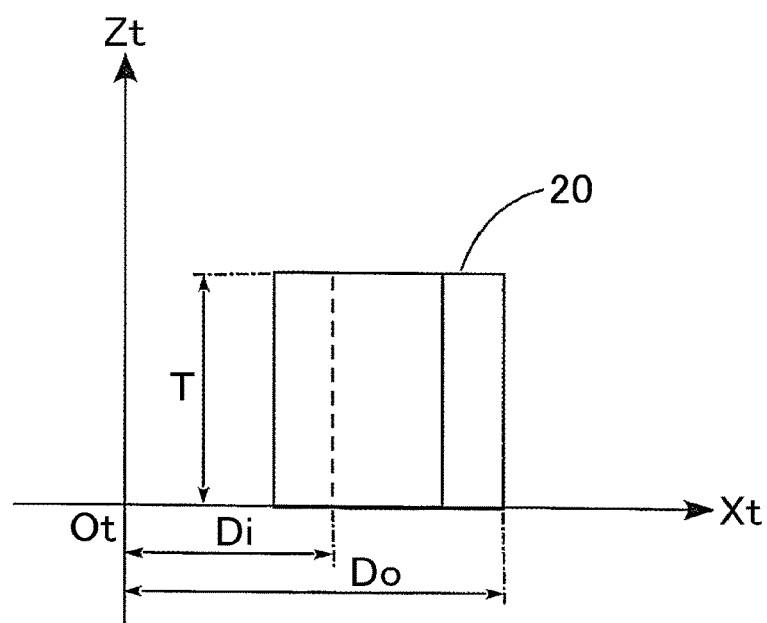
FIG. 5B is a diagram illustrating a calculation region in the gear coordinate system (Xw, Zw) stored in the memory in FIG. 3.

The gear machining simulation apparatus 100 determines the range of a calculation region in the given cross section perpendicular to the tooth space 22 between the teeth 21 to be formed on the workpiece 20. Because the workpiece 20 has a cylindrical shape, the range of the calculation region is determined in accordance with a calculation region definition starting angle α, a calculation region definition ending angle β, an inside diameter Di, an outside diameter Do, and a thickness T (see FIGS. 5A and 5B). The workpiece 20 is assumed to be in contact with an X-Y plane and the calculation region may be in the negative side.

In accordance with the information stored in the memory 110, the first calculator 120 performs a calculation to obtain a plurality of passage points in the workpiece coordinate system (Xw, Yw, Zw) where the definition points P (k) (where k=1 to n) will pass through the cross section S during gear machining, with the workpiece coordinate system (Xw, Yw, Zw) serving as a three-dimensional coordinate system for gear machining. The functions of the first calculator 120 correspond to a "first calculating step" of the simulation method according to this embodiment.

The second calculator 130 causes the cross section S in the workpiece coordinate system (Xw, Yw, Zw) to be disposed parallel to a plane defined by predetermined two of the axes of the workpiece coordinate system (Xw, Yw, Zw), thus converting the passage points in the workpiece coordinate system (Xw, Yw, Zw) obtained by the first calculator 120 into passage points in a two-dimensional coordinate system. The functions of the second calculator 130 correspond to a "second calculating step" of the simulation method according to this embodiment.

In accordance with the passage points in the two-dimensional coordinate system (Xw', Yw') obtained by the second calculator 130, the third calculator 140 decides the shape of the tooth profile 21b to be formed on the workpiece 20 in the two-dimensional coordinate system (Xw', Yw'). The functions of the third calculator 140 correspond to a "third calculating step" of the simulation method according to this embodiment.

The fourth calculator 150 performs a calculation to determine the shape of the teeth 21 of the gear 21A in the three-dimensional coordinate system (Xw, Yw, Zw) in accordance with the shape of the tooth profile 21b in the two-dimensional coordinate system (Xw', Yw') decided by the third calculator 140, the helix angle of each tool edge 11 of the machining tool 10, and the relative positions of the workpiece 20 and the machining tool 10. The functions of the fourth calculator 150 correspond to a "fourth calculating step" of the simulation method according to this embodiment. The components of the first calculator 120 and the components of the third calculator 140 will be described below in relation to specific simulation operations.

The following description discusses specific simulation operations to be performed by the gear machining simulation apparatus 100.

Figure 7A:
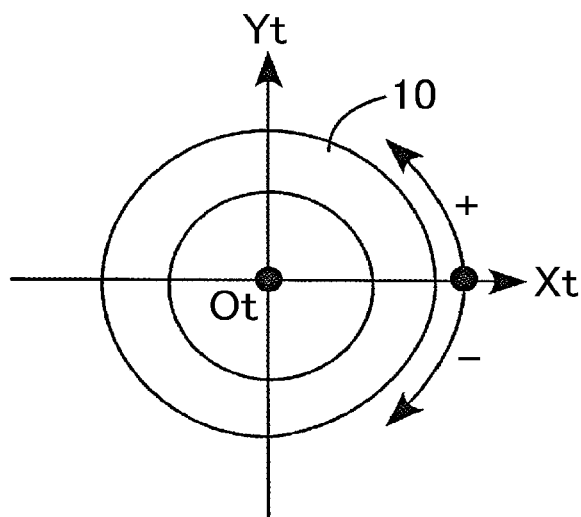
FIG. 7A is a diagram illustrating the tool coordinate system (Xt, Yt) used to provide the definition points of the edge surface in FIG. 6, and positive and negative rotation directions of the machining tool.
Figure 7B:
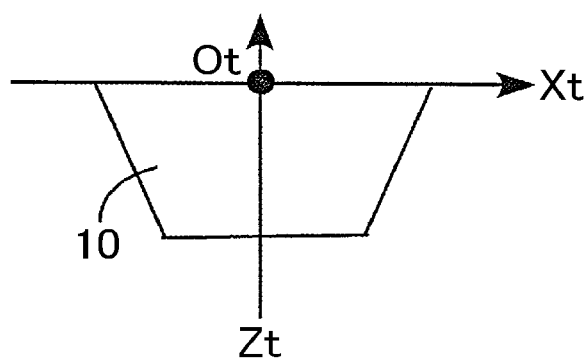
FIG. 7B is a diagram illustrating the tool coordinate system (Xt, Zt) used to provide the definition points of the edge surface in FIG. 6.

First, as illustrated in FIG. 6, the definition point interpolator 121 of the first calculator 120 adds definition points Pc (k, k+1) so as to make interpolations between the definition points P (k) (where k=1 to n) defining the boundary between the edge surface 11b and the lateral surface 11a of each tool edge 11 of the machining tool 10 so that a distance ΔP (k, k+1) between the definition points is smaller than a mesh size described below. As illustrated in FIGS. 7A and 7B, the definition points P (k) and Pc (k, k+1) of the edge surface 11b are defined in the tool coordinate system (Xt, Yt, Zt). This process is carried out on the assumption that counterclockwise rotation of the machining tool 10 is positive (+) when the machining tool 10 is viewed in the positive direction of the rotation axis (i.e., the central axis Zt).

Figure 8:
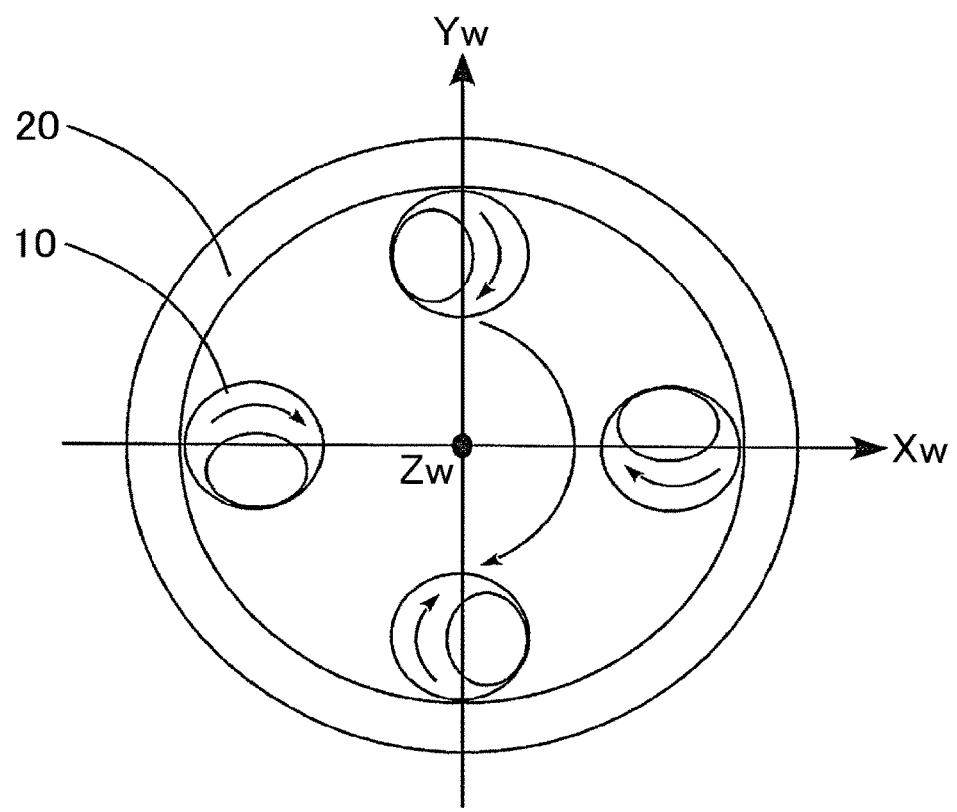
FIG. 8 is a diagram illustrating how passage points are determined by a passage point calculator in FIG. 3 in determining the shape of a tooth profile of an internal gear to be formed when a workpiece is machined by a known machining tool.

The passage point calculator 123 moves the definition points P (k) and Pc (k, k+1) of the edge surface 11b of each tool edge 11 of the machining tool 10 in response to machining operations, and performs a calculation to determine passage points that are intersections of the definition points P (k) and Pc (k, k+1) with the given cross section S perpendicular to the tooth space 22 between the teeth 21 to be formed on the workpiece 20. As illustrated in FIG. 8, unlike actual operations of the machining tool 10 and the workpiece 20, the machining tool 10 is rotated around its central axis Zt and revolved around the central axis Zw of the workpiece 20, with the position of the workpiece 20 fixed. The coordinate values of the definition points P (k) and Pc (k, k+1) coincided with the cross section in this state are determined to be the coordinate values of the passage points.

Figure 9A:
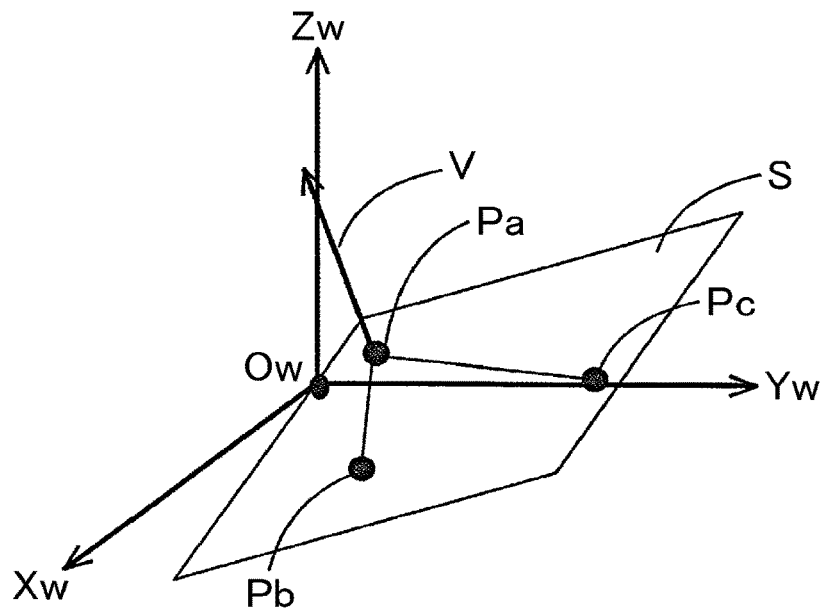
FIG. 9A is a diagram illustrating how a cross section in a three-dimensional coordinate system is converted into a cross section in a two-dimensional coordinate system by a second calculator in FIG. 3.
Figure 9B:
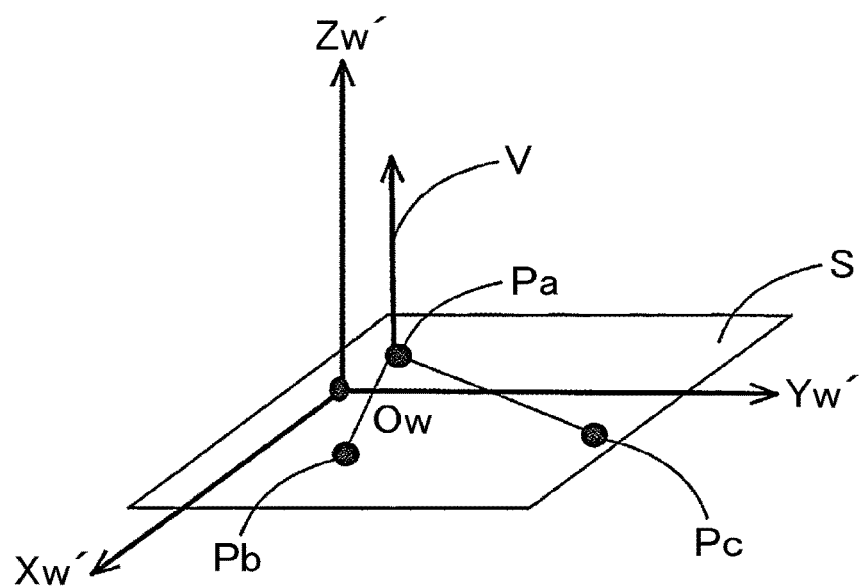
FIG. 9B is a diagram illustrating the cross section obtained by the second calculator in FIG. 3.

As illustrated in FIGS. 9A and 9B, the second calculator 130 changes the orientation of a vector V normal to the cross section S so that the vector V is aligned with the Zw axis of the workpiece coordinate system (Xw, Yw, Zw), thus converting three-dimensional passage points into two-dimensional passage points. Specifically, the second calculator 130 rotates the cross section S around any given point P that is one of a plurality of passage points (e.g., passage points Pa, Pb, and Pc illustrated in FIGS. 9A and 9B), so that the cross section S becomes a plane parallel to a Xw'-Yw' plane, thus converting the passage points Pa, Pb, and Pc into two-dimensional passage points. Note that the value of Zw' is constant in this process. In FIGS. 9A and 9B, the cross section S is rotated around the passage point Pa. The three-dimensional passage points are converted into the two-dimensional passage points in this manner because it is difficult to perform meshing in a three-dimensional space. Another reason is that this conversion reduces the number of dimensions so as to reduce processing load.

Figure 10:
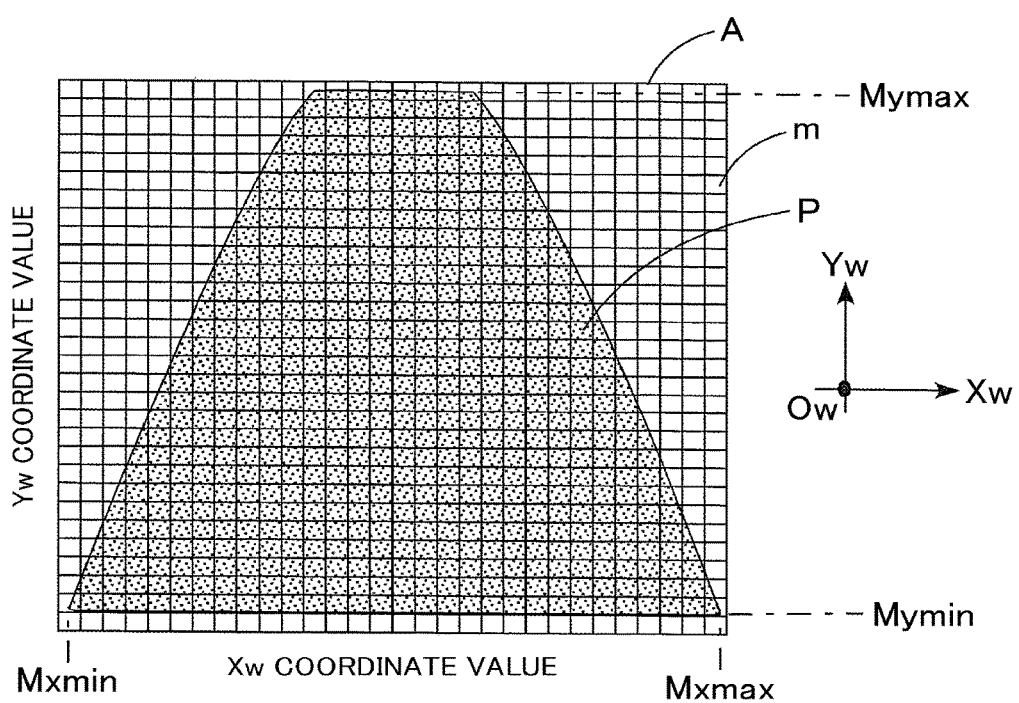
FIG. 10 is a diagram illustrating a rectangular region that includes all passage points and is meshed by a mesher in FIG. 3.

As illustrated in FIG. 10, the mesher 141 of the third calculator 140 determines a rectangular region A including all passage points on the basis of a maximum value Mxmax and a minimum value Mxmin of the two-dimensional passage points P in the Xw direction, and a maximum value Mymax and a minimum value Mymin of the two-dimensional passage points P in the Yw direction. In FIG. 10, the passage points P are indicated by dots and an outline surrounding the dots. The mesher 141 performs meshing by dividing the determined rectangular region A into meshes m of a predetermined size.

Figure 11:
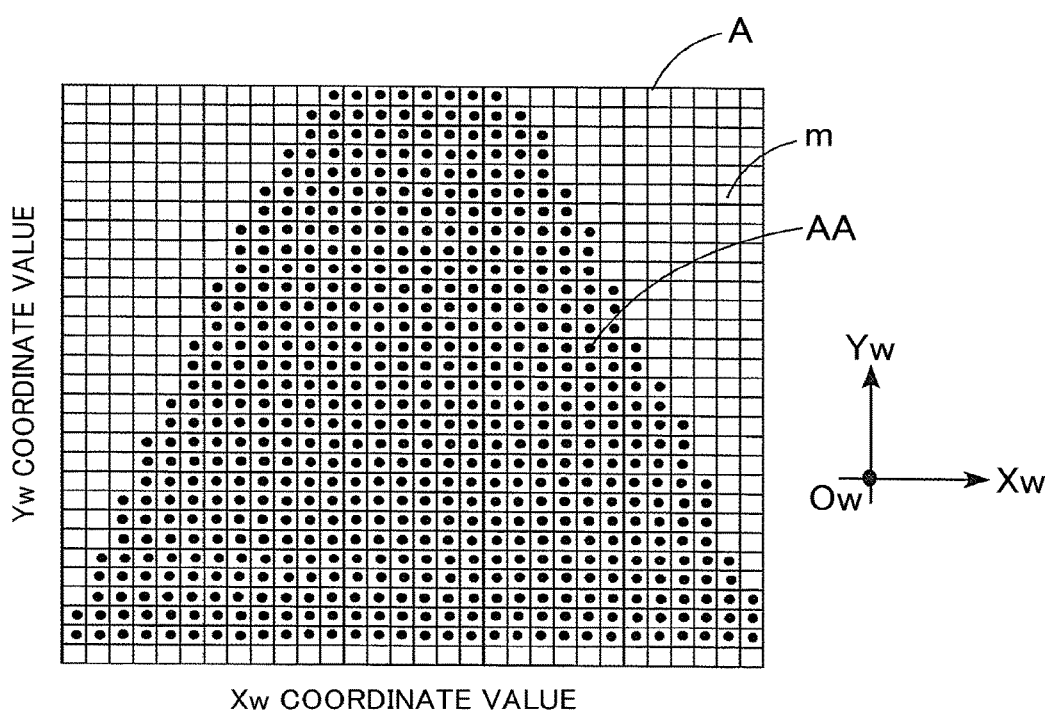
FIG. 11 is a diagram illustrating a passage point region determined by a passage point region calculator in FIG. 3 from meshes including the passage points.

As illustrated in FIG. 11, the passage point region calculator 142 obtains association information indicating associations between the passage points P and the meshes m. On the basis of the association information, the passage point region calculator 142 determines whether the passage point P is present in each mesh m, and performs a calculation to select the meshes m that include the passage points P so as to determine a passage point region AA. In FIG. 11, the passage point region AA is indicated by a set of filled circles.

Figure 12:
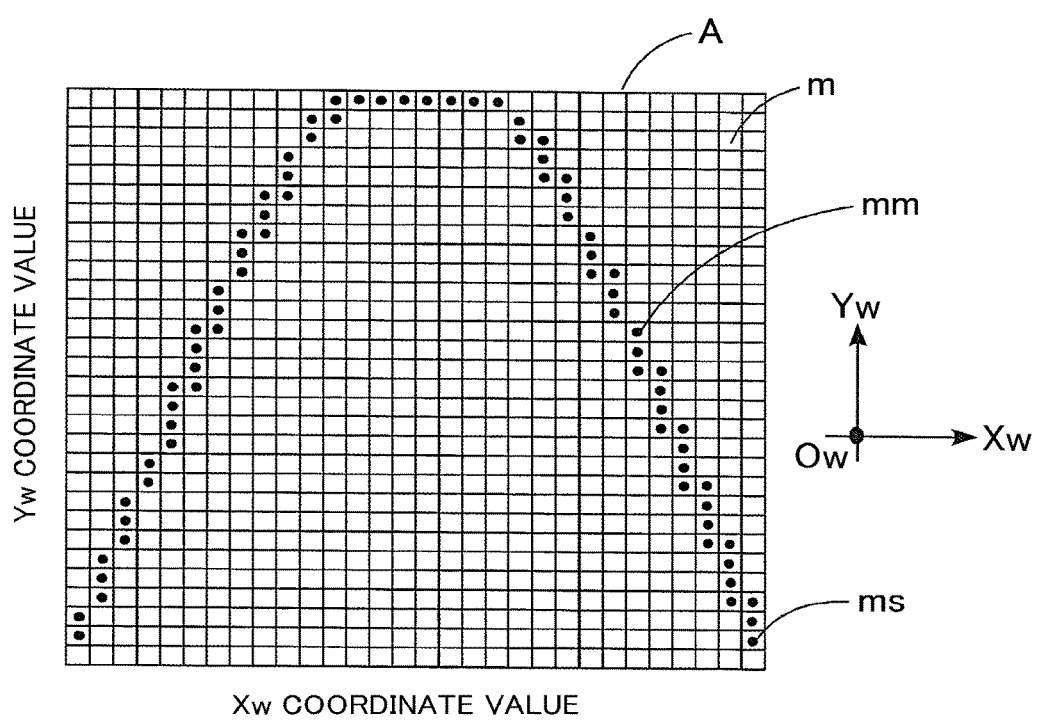
FIG. 12 is a diagram illustrating border meshes that represent the border of the passage point region and are determined by a border mesh calculator in FIG. 3.

As illustrated in FIG. 12, the border mesh calculator 143 performs a calculation to determine the meshes m that represent the border of the passage point region AA to be border meshes mm. When a selected one of the meshes m that includes the passage point P is surrounded by the meshes m including the passage points P, this calculation involves excluding the selected mesh m from candidates for the border meshes mm (or changing the selected mesh m to the mesh m including no passage point P). This process is performed for all the meshes m in the passage point region AA so as to determine the border meshes mm.

As illustrated in FIG. 12, the shape decider 144 first detects a starting mesh ms from the border meshes mm that are continuous with each other. The border meshes mm are handled so that the actual tool edge 11 of the machining tool 10 will be leftward of the border meshes mm in FIG. 12. Thus, when internal gear machining is to be performed, this detection involves finding the mesh m having a small coordinate value in the Yw direction and a large coordinate value in the Xw direction, i.e., finding the border mesh mm in the Yw direction from the lower right mesh m in FIG. 12. When the suitable border mesh mm is found, this border mesh mm is determined to be the starting mesh ms. When no suitable border mesh mm is found, the target for the starting mesh ms is shifted by one mesh in the Xw direction, and the process of finding the suitable border mesh mm in the Yw direction is repeated until the suitable border mesh mm is found. Alternatively, the mesh m having a small coordinate value in the Yw direction and a small coordinate value in the Xw direction may be determined to be the starting mesh ms.

Figure 13A:
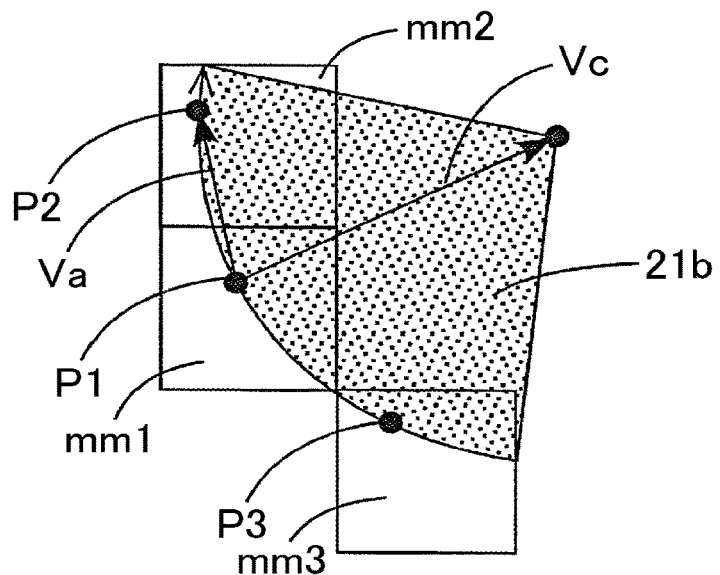
FIG. 13A is a diagram illustrating how border meshes continuous in a clockwise direction are extracted by a shape decider in FIG. 3.
Figure 13B:
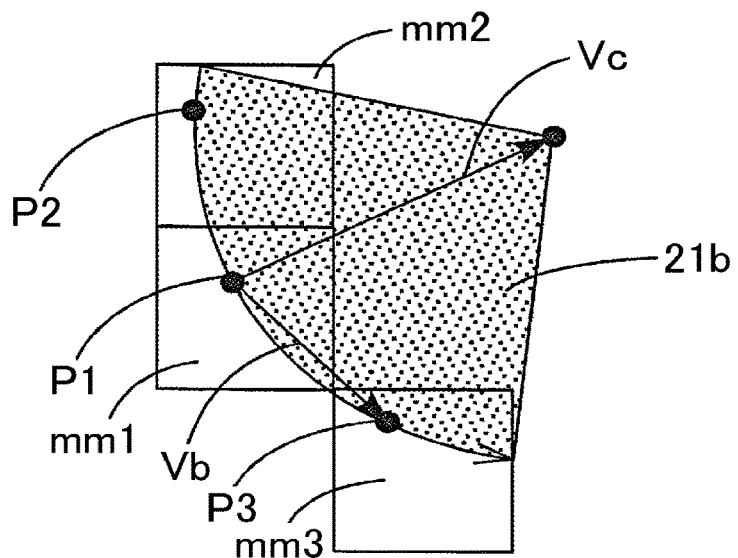
FIG. 13B is a diagram illustrating how border meshes continuous in a counterclockwise direction are extracted by the shape decider in FIG. 3.

The shape decider 144 subsequently finds whether there is any border mesh mm newly connectable to the starting mesh ms in the up-down direction, in the right-left direction, and in the oblique direction, and extracts three continuous border meshes mm. The border meshes mm found in the up-down direction and the right-left direction have higher priority than the border meshes mm found in the oblique direction. As illustrated in FIGS. 13A and 13B, this extraction involves deciding an arc or a line segment using the average or median values of the coordinate values of the passage points P respectively included in each of three extracted border meshes mm1, mm2, and mm3 as the coordinate values of the representative points P1, P2, and P3 in each of the border meshes mm1, mm2, and mm3.

The area indicated by dots in each of FIGS. 13A and 13B represents the tooth profile 21b of the tooth 21. Information on the arc requires information indicative of whether the rotation direction is the clockwise direction or counterclockwise direction. In the case of FIG. 13A, the rotation direction is determined to be the clockwise direction from a traveling direction vector Va and an arc central direction vector Vc. In the case of FIG. 13B, the rotation direction is determined to be the counterclockwise direction from a traveling direction vector Vb and the arc central direction vector Vc.

Figure 14A:
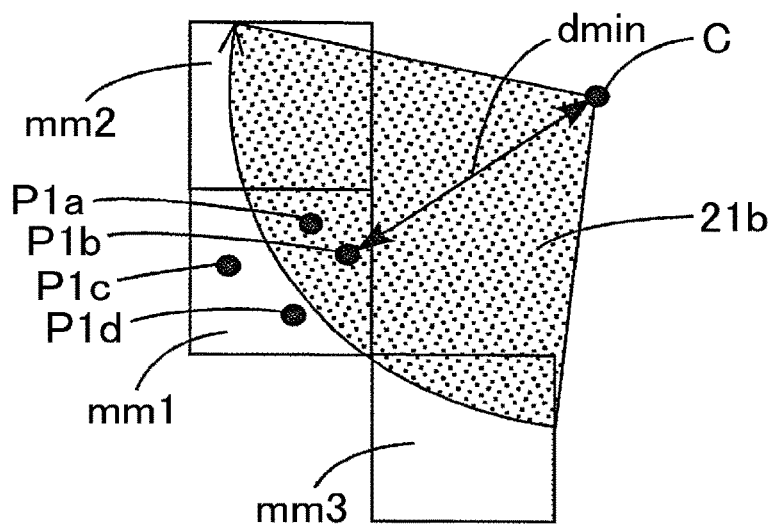
FIG. 14A is a diagram illustrating how shape points are selected from the clockwisely extracted border meshes by the shape decider in FIG. 3.

Suppose that as illustrated in FIG. 14A, a clockwise arc is decided, passage points P1a, P1b, P1c, and P1d belong to the border mesh mm1 that is the middle one of the three continuous border meshes mm1, mm2, and mm3, and the passage point P1b and an arc center C have a shortest distance dmin therebetween. In this case, the passage point P1b is selected as the shape point of the border mesh mm1. In other words, the passage point where the amount of machining is the largest is selected as the shape point.

Figure 14B:
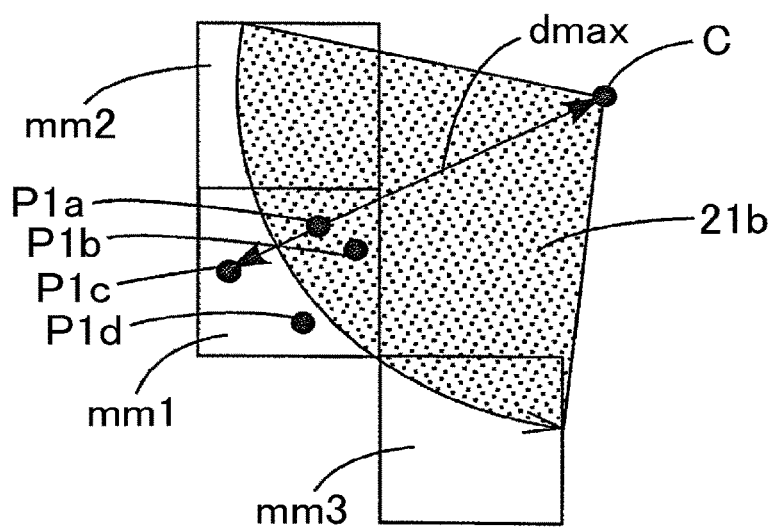
FIG. 14B is a diagram illustrating how shape points are selected from the counterclockwisely extracted border meshes by the shape decider in FIG. 3.

Suppose that as illustrated in FIG. 14B, a counterclockwise arc is decided, the passage points P1a, P1b, P1c, and P1d belong to the border mesh mm1 that is the middle one of the three continuous border meshes mm1, mm2, and mm3, and the passage point P1c and the arc center C have a longest distance dmax therebetween. In this case, the passage point P1c is selected as the shape point of the border mesh mm1. In other words, the passage point where the amount of machining is the largest is selected as the shape point, because the passage point is a point that has undergone machining.

Figure 15:
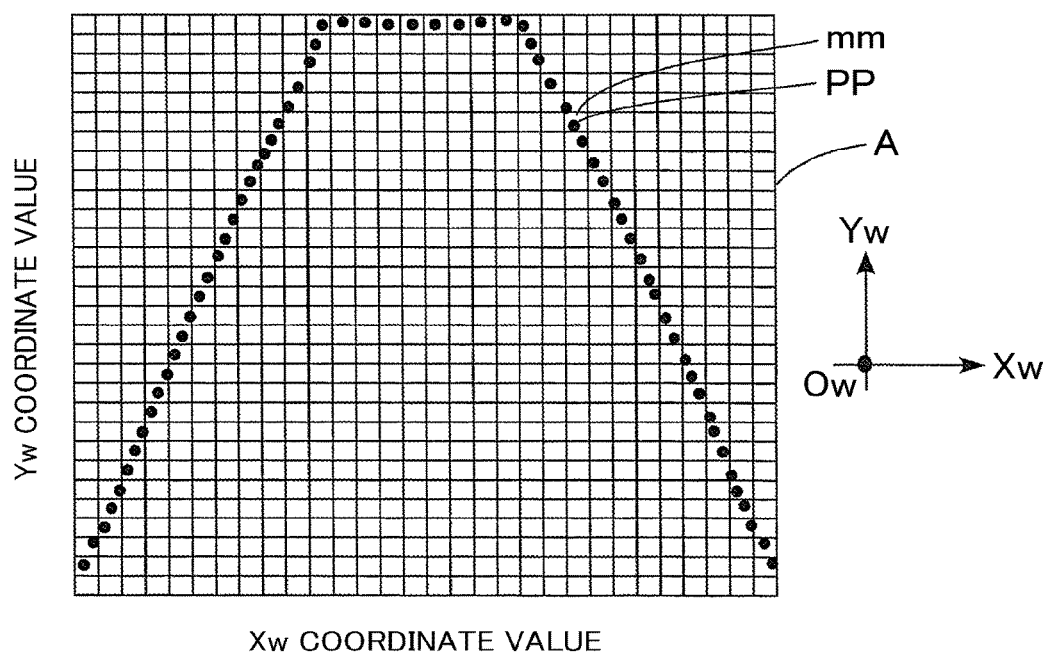
FIG. 15 is a diagram illustrating the shape points selected by the shape decider in FIG. 3.

When a line segment is decided, the distances between all the passage points included in the middle border mesh mm and a line segment offset rightward relative to the traveling direction by a distance of the width of the mesh m multiplied by the square root of two are calculated, and the passage point closest to the offset line segment is selected as the shape point of the border mesh mm. As illustrated in FIG. 15, the shape decider 144 selects shape points PP of all the border meshes mm. The shape decider 144 then decides, in accordance with the shape points PP selected, the shape of the tooth profile 21b to be formed on the workpiece 20 in the two-dimensional coordinate system (Xw', Yw').

The fourth calculator 150 determines the shape of the teeth 21 of the gear 21A in the three-dimensional coordinate system (Xw, Yw, Zw) in accordance with the shape of the tooth profile 21b in the two-dimensional coordinate system (Xw', Yw') decided by the third calculator 140, the helix angle of each tool edge 11 of the machining tool 10, and the relative positions of the workpiece 20 and the machining tool 10. Carrying out these processes determines the three-dimensional shape of the tooth profile 21b of the teeth 21 of the internal gear to be formed when the workpiece 20 is machined by the known machining tool 10.

Figure 16:
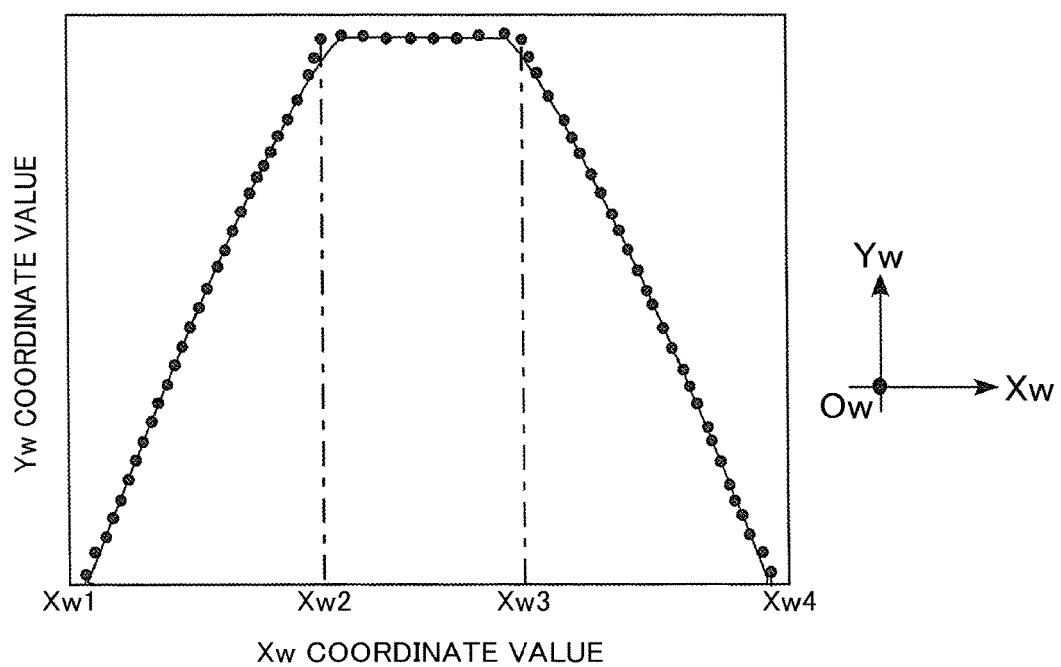
FIG. 16 is a diagram illustrating comparisons between simulation values and theoretical values indicative of the shape points.

Comparisons were made between simulation values and theoretical values indicative of the shape of the tooth profile 21b in the two-dimensional coordinate system (Xw', Yw') decided by the shape decider 144 of the simulation apparatus 100 described above. FIG. 16 illustrates the simulation values indicated by the filled circles, and the theoretical values indicated by the continuous line.

FIG. 16 shows that the simulation values substantially agree with the theoretical values and are at a practical level. There are slight differences between the simulation values and the theoretical values in regions including points defined by the coordinate values Xw2 and Xw3 and points adjacent thereto. These regions each correspond to a shoulder portion of the tooth extending from the tooth tip toward the tooth bottom. Using a filter, for example, corrections may be made to the points defined by the coordinate values Xw2 and Xw3 and the points adjacent thereto, thus reducing the differences.

The above-described embodiment has been described on the assumption that the simulation apparatus 100 determines the shape of the teeth 21 of the internal gear 21A to be formed when the workpiece 20 is machined by the known machining tool 10. Alternatively, the simulation apparatus 100 may determine the shape of the teeth of an external gear to be formed when the workpiece 20 is machined by the known machining tool 10. The processes to be carried out in determining the shape of the teeth of an external gear are substantially similar to the processes to be carried out in determining the shape of the teeth 21 of the internal gear 21A except the process of detecting a starting mesh from continuous border meshes by the shape decider 144.

Suppose that the border meshes mm illustrated in FIG. 12 are the border meshes mm for the tooth profile of an external gear. In this case, the border meshes mm are handled so that the actual tool edge 11 of the machining tool 10 will be rightward of the border meshes mm in FIG. 12. Thus, when external gear machining is to be performed, this process involves finding the mesh m having a small coordinate value in the Yw direction and a small coordinate value in the Xw direction, i.e., finding the border mesh mm in the Yw direction from the lower left mesh m in FIG. 12. When the suitable border mesh mm is found, this border mesh mm is determined to be the starting mesh ms. When no suitable border mesh mm is found, the target for the starting mesh ms is shifted by one mesh in the Xw direction, and the process of finding the suitable border mesh mm in the Yw direction is repeated until the suitable border mesh mm is found.

The above-described embodiment has been described on the assumption that the gear machining simulation apparatus 100 determines the shape of the teeth 21 of the internal gear 21A or the shape of the teeth of an external gear to be formed when the workpiece 20 is machined by the known machining tool 10. Alternatively, the simulation apparatus 100 may determine the shape of each tool edge 11 of the machining tool 10 to form the teeth 21 of the known internal gear 21 A or the teeth of the known external gear.

Determining the shape of the teeth 21 of the gear 21A involves determining the passage points where the definition points of the edge surface 11b of each tool edge 11 of the machining tool 10 will pass through the given cross section S of the workpiece 20 during gear machining. Determining the shape of each tool edge 11 of the machining tool 10, however, involves determining the passage points where the definition points of the tooth profile 21b of the teeth 21 of the gear 21A will pass through a given cross section of the machining tool 10 during gear machining. The following description discusses the processes using the definition points of the tooth profile 21b of the teeth 21 of the gear 21A.

First, the memory 110 stores information on the shape of the workpiece 20, information on a cross section of the tool edge 11 of the machining tool 10 that requires a simulation, and information on a plurality of definition points indicative of the shape of the tooth profile 21b of the gear 21A. Information usable as information indicative of the shape of the tooth profile 21b of the gear 21A includes information on the shape of a gear tooth profile that cannot be given by a mathematical expression (such as information on the shape of a gear tooth profile including an involute curve to which a correction is made), or information on any given points (e.g., equidistant or discrete points) indicative of the shape of a gear involute curve. Any information may be used for any shape of a tooth profile as long as it can be input in the form of coordinate information (or more specifically, three-dimensional coordinates). Information on the tooth profile 21b of the gear 21A obtained using a design tool, such as a CAD, is efficiently input to the simulation apparatus 100.

In the manner similar to that described with reference to FIG. 6, the definition point interpolator 121 of the first calculator 120 performs interpolations between the definition points defining a boundary between the end face and lateral surface of the tooth profile 21b of the teeth 21 so that the distances between the definition points are each smaller than the mesh size described below.

Figure 17A:
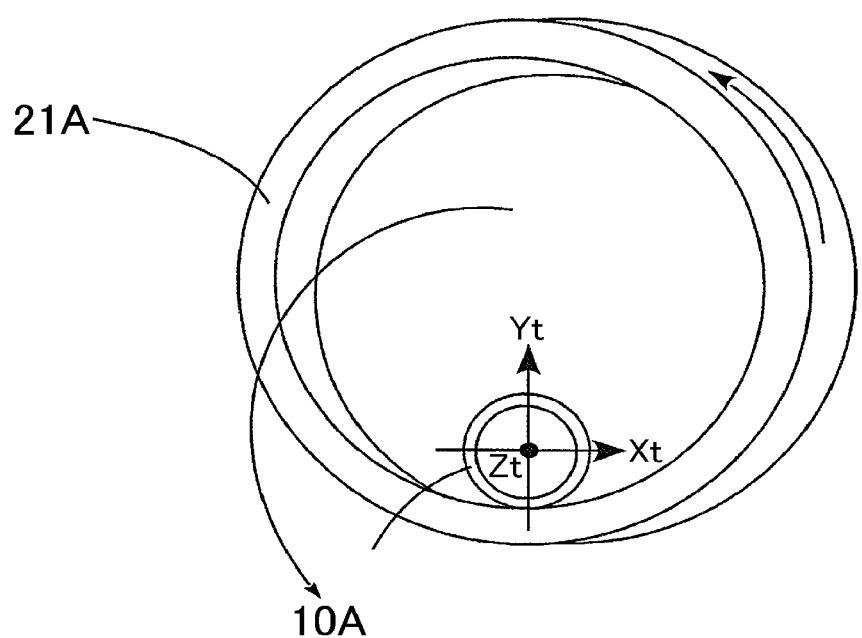
FIG. 17A is a first diagram illustrating how passage points are determined by the passage point calculator in FIG. 3 in determining the shape of a machining tool to form teeth on a known internal gear.
Figure 17B:
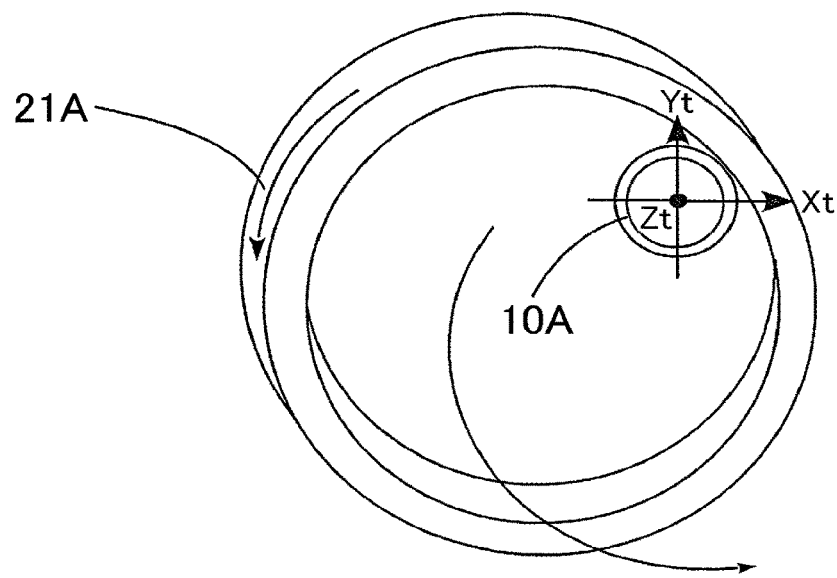
FIG. 17B is a second diagram illustrating how passage points are determined by the passage point calculator in FIG. 3 in determining the shape of the machining tool to form the teeth on the known internal gear.
Figure 17C:
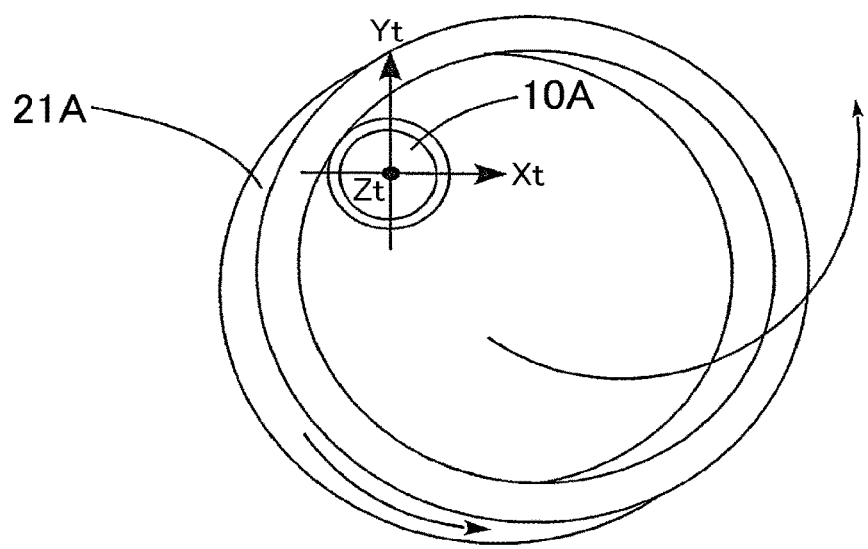
FIG. 17C is a third diagram illustrating how passage points are determined by the passage point calculator in FIG. 3 in determining the shape of the machining tool to form the teeth on the known internal gear.

As illustrated in FIGS. 17A, 17B, and 17C, the passage point calculator 123 moves the definition points of the tooth profile 21b of the teeth 21 in response to machining operations so as to perform a calculation to determine passage points that are intersections of the definition points with any given cross section perpendicular to the edge space 12 of the machining tool 10 to be formed on a machining tool material 10A. In this case, the gear 21A is rotated and revolved around the machining tool material 10A, with the position of the machining tool material 10A fixed. The coordinate values of the definition points coincided with the cross section in this state are determined. The subsequent processes are similar to those described in the above embodiment, and description thereof will be omitted. Carrying out these processes determines the two-dimensional shape of the edge surface 11b of each tool edge 11 of the machining tool 10 to form the teeth 21 of the known internal gear 21A, and the three-dimensional shape of each tool edge 11.

The simulation apparatus 100 may be implemented by installing functional units, such as the memory 110 and the first calculator 120, on an information processor, such as a known personal computer, or an embedded system, such as a programmable logic controller (PLC).

The gear machining simulation apparatus 100 according to this embodiment is configured to perform a simulation of the tooth profile 21b of the gear 21A and is usable for gear machining that involves: causing the central axis Zw of the workpiece 20 and the central axis Zt of the machining tool 10, including on its outer periphery the tool edges 11, to be inclined relative to each other; synchronizing rotation of the workpiece 20 around the central axis Zw of the workpiece 20 and rotation of the machining tool 10 around the central axis Zt of the machining tool 10; and rectilinearly moving, in this state, the machining tool 10 relative to the workpiece 20 along the central axis Zw of the workpiece 20, thus forming the gear 21A on the workpiece 20.

The simulation apparatus 100 includes: the memory 110 to store information on the shape of the workpiece 20, information on the shape of the cross section S of a portion of the workpiece 20 that requires a simulation and is to be machined into the gear 21A, and information on the definition points P (k) (where k=1 to n) indicating the shape of the edge surface 11b of the tool edge 11 of the machining tool 10; the first calculator 120 to perform, in accordance with the information stored in the memory 110, a calculation to obtain a plurality of passage points in the three-dimensional coordinate system (Xw, Yw, Zw) where the definition points P (k) (where k=1 to n) will pass through the cross section S during gear machining; the second calculator 130 to cause the cross section S in the three-dimensional coordinate system (Xw, Yw, Zw) to be disposed parallel to a plane defined by predetermined two of the axes of the three-dimensional coordinate system (Xw, Yw, Zw), thus converting the passage points in the three-dimensional coordinate system (Xw, Yw, Zw) obtained by the first calculator 120 into passage points in the two-dimensional coordinate system (Xw', Yw'); and the third calculator 140 to decide, in accordance with the passage points in the two-dimensional coordinate system (Xw', Yw') obtained by the second calculator 130, the shape of the tooth profile 21b to be formed on the workpiece 20 in the two-dimensional coordinate system (Xw', Yw').

When the shape of the machining tool 10 is known, the above configuration makes it possible to perform a simulation of a cross section of a portion of the workpiece 20 that requires the simulation and is to be machined into the gear 21A by the machining tool 10. This enables examination of differences between simulation values and theoretical values indicative of the shape of the tooth profile 21b to be formed by the machining tool 10. In the process of the simulation, the simulation apparatus 100 converts the three-dimensional coordinate system (Xw, Yw, Zw) into the two-dimensional coordinate system, resulting in a reduction in processing load and an increase in processing speed.

The simulation apparatus 100 further includes the fourth calculator 150 to perform a calculation to determine the shape of the teeth 21 of the gear 21A in the three-dimensional coordinate system (Xw, Yw, Zw) in accordance with the shape of the tooth profile 21b in the two-dimensional coordinate system (Xw', Yw') decided by the third calculator 140, the helix angle of each tool edge 11 of the machining tool 10, and the relative positions of the workpiece 20 and the machining tool 10. This enables examination of differences between simulation values and theoretical values indicative of the three-dimensional shape of the teeth 21.

The third calculator 140 divides the rectangular region A including the passage points in the two-dimensional coordinate system (Xw', Yw') into the meshes m each having a predetermined size, performs a calculation to select the meshes m including the passage points in the two-dimensional coordinate system (Xw', Yw') so as to determine the passage point region AA, performs a calculation to determine the meshes m representing the border of the passage point region AA to be the border meshes mm, and decides the shape of the teeth 21 in accordance with the border meshes mm. This makes it unnecessary to process all the passage points, resulting in a reduction in processing load and an increase in processing speed.

The first calculator 120 makes interpolations between the definition points P (k) (where k=1 to n) defining the boundary between the edge surface 11b and the lateral surface 11a of each tool edge 11 of the machining tool 10 so that the distance $\Delta P$ (k, k+1) between the definition points is smaller than the size of each mesh m, and performs a calculation to obtain passage points in a region surrounded by the definition points P (k) and Pc (k, k+1). Thus, at least one of the definition points P (k) and Pc (k, k+1) is present in each mesh m without exception, leading to an improvement in accuracy of the shape of the teeth 21.

When a plurality of the passage points are present in the border mesh mm, the third calculator 140 selects the passage point where the amount of machining will be the largest as the point representing the shape of the tooth profile 21b. Thus, when the teeth 21 are formed on the workpiece 20, the workpiece 20 will have no portion yet to be machined.

The gear machining simulation method according to this embodiment is used to perform a simulation of the gear tooth profile 21b. Similarly to the simulation apparatus 100, the simulation method according to this embodiment is usable for the gear machining described above. The simulation method includes: the storing step involving storing information on the shape of the workpiece 20, information on the cross section S of a portion of the workpiece 20 that requires a simulation and is to be machined into the gear 21A, and information on a plurality of definition points indicating the shape of the edge surface 11b of each tool edge 11 of the machining tool 10; the first calculating step involving performing, in accordance with the information stored in the storing step, a calculation to obtain a plurality of passage points in the three-dimensional coordinate system (Xw, Yw, Zw) where the definition points P (k) (where k=1 to n) will pass through the cross section S during gear machining; the second calculating step involving causing the cross section S in the three-dimensional coordinate system (Xw, Yw, Zw) to be disposed parallel to a plane defined by predetermined two of the axes of the three-dimensional coordinate system (Xw, Yw, Zw), thus converting the passage points in the three-dimensional coordinate system (Xw, Yw, Zw) obtained in the first calculating step into passage points in the two-dimensional coordinate system (Xw', Yw'); and the third calculating step involving deciding, in accordance with the passage points in the two-dimensional coordinate system (Xw', Yw') obtained in the second calculating step, the shape of the tooth profile 21b to be formed on the workpiece 20 in the two-dimensional coordinate system (Xw', Yw'). Thus, the simulation method achieves effects similar to those of the gear machining simulation apparatus 100 described above.

The gear machining simulation apparatus 100 according to this embodiment may be configured to perform a simulation of the edge surface 11b of each tool edge 11 of the machining tool 10 and is usable for the gear machining described above. In this case, the simulation apparatus 100 includes: the memory 110 to store information on the shape of the workpiece 20, information on a cross section of the tool edge 11 of the machining tool 10 that requires a simulation, and information on a plurality of definition points indicating the shape of the tooth profile 21b of the gear 21A; the first calculator 120 to perform, in accordance with the information stored in the memory 110, a calculation to obtain a plurality of passage points in the three-dimensional coordinate system (Xw, Yw, Zw) where the definition points will pass through the cross section during gear machining; the second calculator 130 to cause the cross section in the three-dimensional coordinate system (Xw, Yw, Zw) to be disposed parallel to a plane defined by predetermined two of the axes of the three-dimensional coordinate system (Xw, Yw, Zw), thus converting the passage points in the three-dimensional coordinate system (Xw, Yw, Zw) obtained by the first calculator 120 into passage points in the two-dimensional coordinate system (Xw', Yw'); and the third calculator 140 to decide the shape of the edge surface 11b in the two-dimensional coordinate system (Xw', Yw') in accordance with the passage points in the two-dimensional coordinate system (Xw', Yw') obtained by the second calculator 130.

When the shape of the gear 21A is known, the above configuration makes it possible to perform a simulation of a cross section of the tool edge 11 of the machining tool 10 that requires the simulation and is to be used for forming the gear 21A. This enables design of the machining tool 10 including the tool edges 11 best-suited to forming the gear 21A. In the process of the simulation, the simulation apparatus 100 converts the three-dimensional coordinate system (Xw, Yw, Zw) into the two-dimensional coordinate system (Xw', Yw'), resulting in a reduction in processing load and an increase in processing speed.

Information on the definition points indicating the shape of the tooth profile 21b of the gear 21A includes information on the shape of a gear tooth profile that cannot be given by a mathematical expression (such as information on the shape of a gear tooth profile including an involute curve to which a correction is made), or information on any given points indicative of the shape of a gear involute curve. If the shape of the tooth profile 21b of the gear 21A is indicated by, in particular, information on the shape of a gear tooth profile that cannot be given by a mathematical expression (such as information on the shape of a gear tooth profile including an involute curve to which a correction is made), or information on any given points (e.g., equidistant or discrete points) indicative of a gear involute curve, the simulation apparatus 100 would be able to perform a simulation of a cross section of the tool edge 11 of the machining tool 10 that is to be used for forming the gear 21A and requires the simulation. This enables design of the machining tool 10 including the tool edges 11 best-suited to forming the gear 21A.

The simulation apparatus 100 further includes the fourth calculator 150 to perform a calculation to determine the shape of the tool edge 11 in the three-dimensional coordinate system (Xw, Yw, Zw) in accordance with the shape of the edge surface 11b in the two-dimensional coordinate system (Xw', Yw') decided by the third calculator 140, the helix angle of each tooth 21 of the gear 21A, and the relative positions of the workpiece 20 and the machining tool 10. This enables examination of differences between simulation values and theoretical values indicative of the three-dimensional shape of each tool edge 11.

The third calculator 140 divides the rectangular region A including the passage points in the two-dimensional coordinate system (Xw', Yw') into the meshes m each having a predetermined size, performs a calculation to select the meshes m including the passage points in the two-dimensional coordinate system (Xw', Yw') so as to determine the passage point region AA, performs a calculation to determine the meshes m representing the border of the passage point region AA to be the border meshes mm, and decides the shape of the edge surface 11b in accordance with the border meshes mm. This makes it unnecessary to process all the passage points, resulting in a reduction in processing load and an increase in processing speed.

The first calculator 120 makes interpolations between the definition points defining the boundary between the tooth profile surface and lateral surface of the tooth 21 of the gear 21A so that the distances between the definition points are each smaller than the size of each mesh m, and performs a calculation to obtain passage points in a region surrounded by the definition points. Thus, at least one of the definition points is present in each mesh m without exception, leading to an improvement in accuracy of the shape of each tool edge 11.

When a plurality of the passage points are present in the border mesh mm, the third calculator 140 selects the passage point where the amount of machining will be the largest as the point representing the shape of the edge surface 11b. Thus, when the tool edges 11 of the machining tool 10 capable of forming the teeth 21 are formed and the teeth 21 is formed on the workpiece 20 by the tool edges 11, the workpiece 20 will have no portion yet to be machined.

The gear machining simulation method according to this embodiment may be used to perform a simulation of the edge surface 11b of each tool edge 11 of the machining tool 10. Similarly to the simulation apparatus 100, the simulation method in this case is usable for the gear machining described above. The simulation method for performing a simulation of the edge surface 11b includes: the storing step involving storing information on the shape of the workpiece 20, information on a cross section of the tool edge 11 of the machining tool 10 that requires a simulation, and information on a plurality of definition points indicating the shape of the tooth profile 21b of the gear 21A; the first calculating step involving performing, in accordance with the information stored in the storing step, a calculation to obtain a plurality of passage points in the three-dimensional coordinate system (Xw, Yw, Zw) where the definition points will pass through the cross section during gear machining; the second calculating step involving causing the cross section in the three-dimensional coordinate system (Xw, Yw, Zw) to be disposed parallel to a plane defined by predetermined two of the axes of the three-dimensional coordinate system (Xw, Yw, Zw), thus converting the passage points in the three-dimensional coordinate system (Xw, Yw, Zw) obtained in the first calculating step into passage points in the two-dimensional coordinate system (Xw', Yw'); and the third calculating step involving deciding the shape of the edge surface 11b in the two-dimensional coordinate system (Xw', Yw') in accordance with the passage points in the two-dimensional coordinate system (Xw', Yw') obtained in the second calculating step. Thus, the simulation method achieves effects similar to those of the gear machining simulation apparatus 100 described above.

What is claimed is:

1. A simulation apparatus for performing a simulation of a tooth profile of a gear to be formed by gear machining, the gear machining involving:
   causing a central axis of a workpiece and a central axis of a machining tool including on its outer periphery a plurality of tool edges to incline relative to each other;
   synchronizing rotation of the workpiece around the central axis of the workpiece and rotation of the machining tool around the central axis of the machining tool; and
   rectilinearly moving, in this state, the machining tool relative to the workpiece along the central axis of the workpiece, and forming the gear on the workpiece,
   the simulation apparatus comprising:
   a memory to store information on a shape of the workpiece, information on a shape of a cross section of a portion of the workpiece that is necessary for the simulation and is to be machined into the gear, and information on a plurality of definition points indicating a shape of an edge surface of each tool edge of the machining tool;

a first calculator to perform, in accordance with the information stored in the memory, a calculation to obtain a plurality of passage points in a three-dimensional coordinate system where the definition points will pass through the cross section during the gear machining;

a second calculator to cause the cross section in the three-dimensional coordinate system to be disposed parallel to a plane defined by predetermined two of axes of the three-dimensional coordinate system, and converting the passage points in the three-dimensional coordinate system obtained by the first calculator into passage points in a two-dimensional coordinate system; and a third calculator to decide, in accordance with the passage points in the two-dimensional coordinate system obtained by the second calculator, a shape of the tooth profile to be formed on the workpiece in the two-dimensional coordinate system.

2. The simulation apparatus according to claim 1, further comprising a fourth calculator to perform a calculation to determine a shape of teeth of the gear in the three-dimensional coordinate system in accordance with the shape of the tooth profile in the two-dimensional coordinate system decided by the third calculator, a helix angle of each tool edge of the machining tool, and relative positions of the workpiece and the machining tool.

3. The simulation apparatus according to claim 1, wherein the third calculator divides a rectangular region including the passage points in the two-dimensional coordinate system into meshes each having a predetermined size, performs a calculation to select the meshes including the passage points in the two-dimensional coordinate system so as to determine a passage point region, performs a calculation to determine the meshes representing an border of the passage point region to be border meshes, and decides the shape of the tooth profile in accordance with the border meshes.

4. The simulation apparatus according to claim 3, wherein the first calculator makes interpolations between the definition points defining a boundary between the edge surface and a lateral surface of the tool edge of the machining tool so that a distance between the definition points is smaller than the size of each mesh, and performs a calculation to obtain the passage points in a region surrounded by the definition points.

5. The simulation apparatus according to claim 3, wherein when a plurality of the passage points are present in the border mesh, the third calculator selects the passage point where an amount of machining will be the largest as a point representing the shape of the tooth profile.

6. A simulation method for performing a simulation of a tooth profile of a gear to be formed by gear machining, the gear machining involving:

causing a central axis of a workpiece and a central axis of a machining tool including on its outer periphery a plurality of tool edges to incline relative to each other;
synchronizing rotation of the workpiece around the central axis of the workpiece and rotation of the machining tool around the central axis of the machining tool; and
rectilinearly moving, in this state, the machining tool relative to the workpiece along the central axis of the workpiece, and forming the gear on the workpiece, the simulation method comprising:
a) storing info illation on a shape of the workpiece, information on a shape of a cross section of a portion of the workpiece that is necessary for the simulation and is to be machined into the gear, and information on a plurality of definition points indicating a shape of an edge surface of each tool edge of the machining tool;
b) performing, in accordance with the information stored in step a), a calculation to obtain a plurality of passage points in a three-dimensional coordinate system where the definition points will pass through the cross section during the gear machining;
c) causing the cross section in the three-dimensional coordinate system to be disposed parallel to a plane defined by predetermined two of axes of the three-dimensional coordinate system, and converting the passage points in the three-dimensional coordinate system obtained in step b) into passage points in a two-dimensional coordinate system; and
d) deciding, in accordance with the passage points in the two-dimensional coordinate system obtained in step c), a shape of the tooth profile to be formed on the workpiece in the two-dimensional coordinate system.

7. A simulation apparatus for performing a simulation of an edge surface of each of a plurality of tool edges on an outer periphery of a machining tool for gear machining, the gear machining involving:

causing a central axis of a workpiece and a central axis of the machining tool to incline relative to each other;
synchronizing rotation of the workpiece around the central axis of the workpiece and rotation of the machining tool around the central axis of the machining tool; and
rectilinearly moving, in this state, the machining tool relative to the workpiece along the central axis of the workpiece, thus forming a gear on the workpiece, the simulation apparatus comprising:
a memory to store information on a shape of the workpiece, information on a shape of a cross section of the tool edge of the machining tool that is necessary for the simulation, and information on a plurality of definition points indicating a shape of a tooth profile of the gear;
a first calculator to perform, in accordance with the information stored in the memory, a calculation to obtain a plurality of passage points in a three-dimensional coordinate system where the definition points will pass through the cross section during the gear machining;
a second calculator to cause the cross section in the three-dimensional coordinate system to be disposed parallel to a plane defined by predetermined two of axes of the three-dimensional coordinate system, thus converting the passage points in the three-dimensional coordinate system obtained by the first calculator into passage points in a two-dimensional coordinate system; and
a third calculator to decide a shape of the edge surface in the two-dimensional coordinate system in accordance with the passage points in the two-dimensional coordinate system obtained by the second calculator.

8. The simulation apparatus according to claim 7, wherein the information on the definition points indicating the shape of the tooth profile of the gear includes information on a shape of a gear tooth profile that cannot be given by a mathematical expression.

9. The simulation apparatus according to claim 8, further comprising a fourth calculator to perform a calculation to determine a shape of the tool edge in the three-dimensional coordinate system in accordance with the shape of the edge surface in the two-dimensional coordinate system decided by the third calculator, a helix angle of a tooth of the gear, and relative positions of the workpiece and the machining tool.

10. The simulation apparatus according to claim 8, wherein the third calculator divides a rectangular region including the passage points in the two-dimensional coordinate system into meshes each having a predetermined size, performs a calculation to select the meshes including the passage points in the two-dimensional coordinate system so as to determine a passage point region, performs a calculation to determine the meshes representing an border of the passage point region to be border meshes, and decides the shape of the edge surface in accordance with the border meshes.

11. The simulation apparatus according to claim 10, wherein the first calculator makes interpolations between the definition points defining a boundary between a tooth profile surface and a lateral surface of the tooth of the gear so that a distance between the definition points is smaller than the size of each mesh, and performs a calculation to obtain the passage points in a region surrounded by the definition points.

12. The simulation apparatus according to claim 10, wherein when a plurality of the passage points are present in the border mesh, the third calculator selects the passage point where an amount of machining will be the largest as a point representing the shape of the edge surface.

13. The simulation apparatus according to claim 8, wherein the information on the definition points indicating the shape of the tooth profile of the gear includes information on a shape of a gear tooth profile that cannot be given by a mathematical expression comprises information on a shape of a gear tooth profile including an involute curve to which a correction is made.

14. The simulation apparatus according to claim 8, wherein the information on the definition points indicating the shape of the tooth profile of the gear includes information on a shape of a gear tooth profile that cannot be given by a mathematical expression comprises information on any given points indicative of a shape of a gear involute curve.

15. A simulation method for performing a simulation of an edge surface of each of a plurality of tool edges on an outer periphery of a machining tool for gear machining, the gear machining involving:

causing a central axis of a workpiece and a central axis of the machining tool to incline relative to each other;

synchronizing rotation of the workpiece around the central axis of the workpiece and rotation of the machining tool around the central axis of the machining tool; and rectilinearly moving, in this state, the machining tool relative to the workpiece along the central axis of the workpiece, and forming a gear on the workpiece, the simulation method comprising:

a) storing information on a shape of the workpiece, information on a shape of a cross section of the tool edge of the machining tool that is necessary for the simulation, and information on a plurality of definition points indicating a shape of a tooth profile of the gear;

b) performing, in accordance with the information stored in step a), a calculation to obtain a plurality of passage points in a three-dimensional coordinate system where the definition points will pass through the cross section during the gear machining;

c) causing the cross section in the three-dimensional coordinate system to be disposed parallel to a plane defined by predetermined two of axes of the three-dimensional coordinate system, and converting the passage points in the three-dimensional coordinate system obtained in step b) into passage points in a two-dimensional coordinate system; and d) deciding a shape of the edge surface in the two-dimensional coordinate system in accordance with the passage points in the two-dimensional coordinate system obtained in step c).

* * * * *